(12) United States Patent
Feinberg et al.

(10) Patent No.: US 8,918,501 B2
(45) Date of Patent: Dec. 23, 2014

(54) PATTERN-BASED COMPUTATIONAL HEALTH AND CONFIGURATION MONITORING

(75) Inventors: Bonnie Nicole Feinberg, Bellevue, WA (US); Vinay Balasubramaniam, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 13/294,066

(22) Filed: Nov. 10, 2011

(65) Prior Publication Data
US 2013/0124713 A1    May 16, 2013

(51) Int. Cl.
G06F 15/173    (2006.01)
G06F 11/07    (2006.01)
G06F 11/30    (2006.01)

(52) U.S. Cl.
CPC ........ *G06F 11/0769* (2013.01); *G06F 11/3055* (2013.01); *G06F 11/3086* (2013.01); *G06F 11/3068* (2013.01)
USPC ........... 709/224; 717/120; 717/121; 717/122; 717/123

(58) Field of Classification Search
CPC ............ H04L 41/0681; H04L 41/141–41/145; H04L 41/20; H04L 43/14
USPC .................................. 709/224; 717/120–123
See application file for complete search history.

(56) References Cited

U.S. PATENT DOCUMENTS

| | | | |
|---|---|---|---|
| 7,103,874 B2 * | 9/2006 | McCollum et al. | 717/121 |
| 7,398,511 B2 * | 7/2008 | El-Shimi et al. | 717/104 |
| 7,979,245 B1 * | 7/2011 | Bourlatchkov et al. | 703/2 |
| 8,285,836 B2 * | 10/2012 | Haga et al. | 709/224 |
| 8,572,244 B2 * | 10/2013 | Campagnoni | 709/224 |
| 2007/0168493 A1 * | 7/2007 | Sarwono et al. | 709/224 |
| 2008/0155517 A1 * | 6/2008 | Yan et al. | 717/140 |
| 2009/0182866 A1 * | 7/2009 | Watanabe et al. | 709/224 |
| 2010/0146011 A1 * | 6/2010 | Klicnik et al. | 707/803 |
| 2010/0251242 A1 | 9/2010 | Sivasubramanian et al. | |
| 2011/0099420 A1 | 4/2011 | MacDonald McAlister et al. | |

(Continued)

OTHER PUBLICATIONS

Simmhan, et al., "GrayWulf: Scalable Software Architecture for Data Intensive Computing", Retrieved at <<http://ieeexplore.ieee.org/stamp/stamp.jsp?tp=&arnumber=4755781>>, Proceedings of 42nd Hawaii International Conference on System Sciences, Jan. 5-8, 2009, pp. 1-10.

(Continued)

*Primary Examiner* — Duyen Doan
(74) *Attorney, Agent, or Firm* — Jim Sfekas; Kate Drakos; Micky Minhas

(57) ABSTRACT

Monitoring knowledge is distilled into platform-nonspecific patterns of high-level language elements compiled into management packs or other rule packs targeting specific platforms. A server health and/or configuration monitoring knowledge compiler accepts distillation document(s) and target-specific information, and generates target-specific rule packs to be consumed by monitoring tools to monitor specific target platforms consistent with the platform-nonspecific monitoring elements. Computational rule pack generation is qualitatively different from manual rule pack creation. Plug-ins tailor the compiler to generate on-premises or cloud-based rule packs. Distillation element examples include monitor alert types, instructional content types, target attributes and tags, monitored item types, event alert types, performance collection types, policy monitor types, and threshold monitor types. Tags on monitoring elements indicate relevant products, locations, product features, monitoring tool features, contributors, etc. Runtime code is shared by multiple rule packs for different target platforms.

20 Claims, 3 Drawing Sheets

(56) References Cited

U.S. PATENT DOCUMENTS

| | | | |
|---|---|---|---|
| 2011/0106926 A1 | 5/2011 | McClain et al. | |
| 2011/0126197 A1 | 5/2011 | Larsen et al. | |
| 2011/0145836 A1 | 6/2011 | Wheeler et al. | |
| 2012/0084413 A1* | 4/2012 | Pasternak | 709/221 |

OTHER PUBLICATIONS

"Introducing Windows Server AppFabric", Retrieved at <<http://msdn.microsoft.com/en-us/library/ee677312.aspx>>, Sep. 27, 2011, pp. 5.

Hill, et al., "Applicability of the Willow Architecture for Cloud Management", Retrieved at <<http://www.cs.virginia.edu/~humphrey/papers/WillowCloudManagement.pdf>>, Proceedings of 6th International Conference on Autonomic Computing and Communications, Jun. 19, 2009, pp. 31-36.

"Automating Management Pack Development", Retrieved at <<http://msdn.microsoft.com/en-us/library/bb437607.aspx>>, May 22, 2009, pp. 2.

"Microsoft Exchange Best Practices Analyzer v2.8", Retrieved at <<http://www.microsoft.com/download/en/details.aspx?id=22485, Jun. 6, 2007, pp. 2.

"Best Practices Analyzers", Retrieved at <<http://blogs.technet.com/b/peteh/archive/2008/09/25/best-practices-analyzers.aspx>>, Sep. 25, 2008, pp. 3.

"How to Create a Management Pack", Retrieved at <<http://msdn.microsoft.com/en-us/library/bb437626.aspx>>, May 22, 2009, pp. 9.

"How to Display Management Pack Contents", Retrieved at <<http://msdn.microsoft.com/en-us/library/bb437504.aspx>>, May 22, 2009, pp. 5.

"JSON", Retrieved at <<http://en.wikipedia.org/wiki/JSON>>, Oct. 23, 2011, pp. 8.

"Relax NG", Retrieved at <<http://en.wikipedia.org/wiki/RelaxNG>>, Jul. 9, 2010, pp. 4.

"Server (computing)", Retrieved at <<http://en.wikipedia.org/wiki/Server_(computing)>>, Oct. 24, 2011, pp. 6.

"Software configuration management", Retrieved at <<http://en.wikipedia.org/wiki/Software_configuration_management>>, Oct. 13, 2011, pp. 3.

"SQL Server Monitoring Management Pack", Retrieved at <<http://www.microsoft.com/download/en/details.aspx?id=10631>>, May 6, 2011, pp. 4.

"System Center Essentials", Retrieved at <<http://en.wikipedia.org/wiki/System_Center_Essentials>>, Mar. 16, 2011, pp. 2.

"System Center Operations Manager", Retrieved at <<http://en.wikipedia.org/wiki/System_Center_Operations_Manager>>, Oct. 10, 2011, pp. 3.

* cited by examiner

PATTERN-BASED COMPUTATIONAL HEALTH AND CONFIGURATION MONITORING

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In computing, "servers" are programs that serve the requests of other programs, which are known as the server's "clients". A server performs computational tasks on behalf of its clients. The clients may be running on the same computer as the server, or the server and client computers may be connected through a network. Servers provide a wide variety of services, both inside local or private networks and within the public Internet. A few of the many kinds of servers in use include application servers dedicated to running certain software applications, database servers, email servers, file servers, game servers, name (e.g., domain name) servers, network servers whose primary purpose is to support network communication, print servers, proxy (intermediary) servers, and web servers, but discussion of servers herein is not limited to these specific examples.

Server configurations and operations can be complex, but tools exist to monitor server status and activity. Tools are used, for example, to monitor server performance, server availability, server compliance with specific best practices, and other aspects of server health. Monitoring tools may provide alerts when specified thresholds are passed, e.g., threshold values that represent an amount of free storage remaining, a processing delay, a processing item count, or the like. Monitoring tools may also provide alert(s) when an event is detected which indicates a health issue. Monitoring tools may also provide server administrators with instructions on how to prevent, diagnose, and resolve undesirable server issues.

SUMMARY

Server monitoring tools sometimes use similar pieces of knowledge for different monitored products, or for different versions of a given monitored product. However, the working representations of that knowledge can differ significantly, leading to substantial development and maintenance costs as monitoring tools change, as monitored products change, and as monitored information changes. Some embodiments described herein provide portable, concise, and efficient representation and use of server monitoring knowledge.

Some embodiments deal specifically with server health and/or configuration monitoring knowledge ("SHCMK"), such as rules, health models, alert conditions, script effects, and instructional content, for example. Monitoring knowledge may be represented for instance in management packs for database, email, intranet, middleware, and other servers. Some embodiments deal with rule packs in general, which includes SHCMK management packs as well as other health and/or configuration monitoring rule files, regardless of whether they contain elements that are specifically designed for monitoring servers.

In some embodiments, an administrator, developer, or other user generates a rule pack, such as a management pack or a set of best practices rules. The user indicates by electronic input to an SHCMK compiler machine an SHCMK distillation document configuring a computer-readable memory. The SHCMK distillation document is not itself consumable by a familiar management tool, but is instead a high-level representation of monitoring knowledge in a form that is more concise, portable, and/or efficient than familiar management packs, for example. The SHCMK distillation document has monitoring knowledge elements which are declared in a high-level computer language. The monitoring elements provide at least one platform-nonspecific pattern for monitoring computational health and/or computational configuration.

The user also denotes a target identification, such as a target definition document, again by electronic input to the SHCMK compiler machine. The target identification specifies at least one target platform to be monitored. The compiler will generate target-specific rule packs for each target selected. These target-specific rule packs comply with requirements of the monitoring tool which will be using them to monitor the desired server applications.

The SHCMK compiler machine computationally generates an electronic digital SHCMK rule pack from the SHCMK distillation document and the target identification, and the rule pack is acquired by the user. The SHCMK rule pack is specific to a target platform that is identified in the target identification, and the SHCMK rule pack includes an implementation of an SHCMK element of the SHCMK distillation document. The implementation is consumable by a familiar monitoring tool to allow monitoring of the target platform consistent with the monitoring element.

Briefly, in some embodiments the compiler takes one or more SHCMK distillation documents, one or more target definition documents, one or more target identifiers, and produces one or more TSRP (target-specific rule pack) documents. The TSRP documents can then be applied to specific monitoring tools to monitor specific variants and versions of server applications.

In some embodiments, the SHCMK compiler includes a preprocessor front end which builds an internal representation of the distillation. A back end translates the internal representation into platform-specific rule pack(s). In some embodiments, plug-ins tailor the SHCMK compiler back end so it will generate on-premises rule packs, cloud-based rule packs, and other TSRPs. In some embodiments, the SHCMK compiler machine generates, from the same SHCMK monitoring element(s), different SHCMK rule packs for respective different versions of a particular target product, and/or different SHCMK rule packs for respective different target products.

From a monitoring knowledge compiler point of view, as opposed to a user perspective, some embodiments computationally generate a rule pack. Some do this in part by obtaining a rule pack distillation configuring a computer-readable memory. The rule pack distillation has monitoring elements declared in a high-level computer language. In some embodiments, the monitoring elements individually and/or collectively provide at least one platform-nonspecific pattern for generating computational rules directed to assessing health and/or configuration.

Some embodiments computationally generate an electronic digital rule pack from the rule pack distillation document and a target identification document, e.g., by using familiar source-to-source language translation mechanisms adapted to generate a rule pack containing human-readable machine-parsable computational rules specific to the target platform. Some distillation document monitoring element examples include monitor alert types, instructional content types, target attributes and tags, monitored item types, event alert types, performance collection types, policy monitor types, and threshold monitor types.

Some embodiments use a platform-specific target template to map at least one distillation document monitoring element to a particular target platform while generating the rule pack. For example, in some embodiments different templates are used for on-premises versus cloud database servers.

Some embodiments associate monitoring elements with target sets by tagging the monitoring elements. Monitoring elements may be organized according to attributes such as the relevant products, relevant locations (e.g., local vs. cluster vs. cloud, or on-premise vs. cloud), contributor(s), and so on.

Computational rule pack generation is qualitatively different from manual creation of rule packs. For example, some generated rule packs show greater consistency between rule packs than manually written rule packs. Some generated rule packs are more concise than functionally interchangeable manually written rule packs. In many cases, generated rule packs are also produced more quickly than functionally interchangeable manually written rule packs.

From an architectural perspective, some embodiments include a logical processor and a memory in operable communication with the logical processor. An SHCMK distillation document residing in the memory has monitoring elements declared in a high-level computer language. The elements provide at least one platform-nonspecific pattern for monitoring computational health and/or computational configuration. A target identification residing in the memory specifies at least one target platform to be monitored. A monitoring knowledge compiler will compile the distillation document and the target identification and generate a rule pack that is specifically arranged to monitor computational health and/or computational configuration of the target platform. Some embodiments also include a template residing in the memory and containing a mapping from the distillation document to a particular identified target.

Some embodiments include an SHCMK runtime which provides runtime support code. Efficiency and consistency are enhanced, because portions of the runtime code are shared by and invocable by multiple rule packs for different target platforms.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
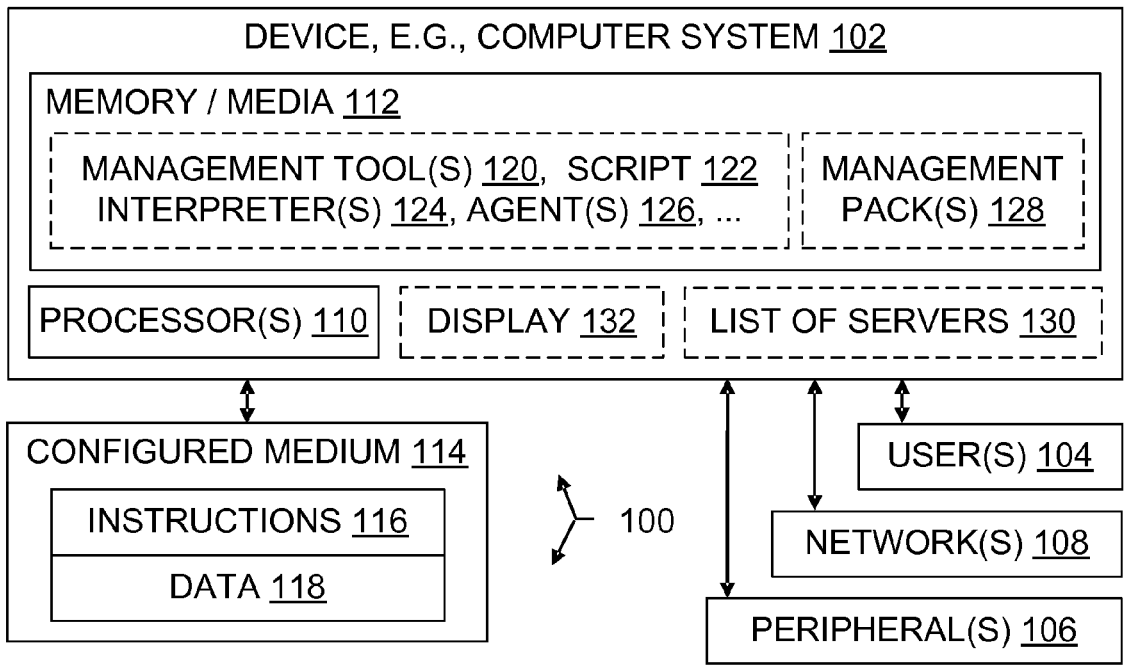
FIG. 1 is a block diagram illustrating a computer system having at least one processor and at least one memory, and other items in an operating environment which may be present on multiple network nodes, and also illustrating configured storage medium embodiments.

For many different monitoring tools, similar knowledge is used to help identify issues and recommend fixes for health and configuration problems. Even in the context of a specific tool, similar monitoring knowledge patterns can be discerned, with slight variations. The monitoring of health and configuration can be inefficient, as multiple similar queries are executed against sources of health and configuration information. Large development and maintenance costs are sometimes incurred as monitoring tools evolve, products evolve, and platforms evolve. Customers are given an inconsistent experience, due to the difficulty and expense of keeping monitoring knowledge stored in many different formats for many different tools for many different versions of the products being monitored.

Some embodiments described herein use a pattern-based high-level language description to express health and configuration monitoring knowledge. A knowledge compiler processes this high-level language to generate artifacts for use as input to various monitoring platforms. A monitoring runtime reduces or eliminates redundant queries against monitored products, reducing maintenance costs by centralizing monitoring implementations in a single copy of code which is reused by many different monitoring workflows. Since there is an authoritative central copy of knowledge written in high-level language, a consistent experience can be delivered to customers no matter what tool they choose to monitor the health and configuration of the software and no matter what version or form of product they use across the space of appliances, boxed products, and the cloud.

In short, some embodiments provide a pattern-based high-level language for health and configuration knowledge. In some, a knowledge compiler processes this high-level language into the monitoring artifacts such as server management packs. In some, a highly efficient monitoring runtime promotes code reuse. In some, a knowledge editor is provided, specifically designed to edit the pattern-based high-level language for health and configuration knowledge; a familiar text editor may also be used. Some embodiments include a process and tools for reviewing knowledge prior to publication.

Some embodiments described herein may be viewed in a broader context. For instance, concepts such as high-level languages, compilation for source-to-source translation, servers, health and configuration monitoring, rules, targets, and plug-ins may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving programming languages, compilation, servers, monitoring, rules, targets, and/or plug-ins are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise beyond the scope of human performance alone. "Computational steps" are steps performed computationally. Neither "automatically" nor "computationally" necessarily means "immediately".

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"SHCMK" means "server health and/or configuration monitoring knowledge". SHCMK distillation documents, for example, are digital documents in which target-nonspecific server health and/or configuration monitoring knowledge is expressed in a high-level language. Similarly, SQL management packs and best practices rule packs are examples of SHCMK rule packs.

"XML" refers to a set of rules for encoding documents, and is also used in a looser sense to refer to languages which conform to those encoding rules. XML is not, strictly speaking, a language, although people often use the term that way and the term itself stands for eXtensible Markup Language. XML is a set of rules for encoding documents in machine-readable (a.k.a. "machine-parsable") form. But one can also use "XML" to refer to the language expressed in those encoded documents; that is, "XML" is sometimes used to refer to a high-level language which is consistent with the XML set of rules for encoding documents.

Throughout this document, use of the optional plural "(s)", "(es)", or "(ies)" means that one or more of the indicated feature is present. For example, "document(s)" means "one or more documents" or equivalently "at least one document".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as acquiring, associating, causing, compiling, configuring, containing, contributing, declaring, denoting, diagnosing, generating, getting, identifying, including, indicating, invoking, mapping, monitoring, obtaining, producing, providing, residing, resolving, satisfying, specifying, tagging, tailoring, using (or associates, associated, causes, caused, compiles, compiled, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a transitory signal on a wire, for example. No claim covers a signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media, as opposed to merely a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104. Neither a computer-readable medium nor a computer-readable memory includes a signal per se.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by pattern-based computational health and configuration monitoring as discussed herein.

Management tools 120 (e.g., Microsoft® System Center Operations Manager, Microsoft® Best Practices Analyzer and similar tools from Microsoft Corporation and/or other vendors), scripts 122, shells and other command or script interpreters 124, monitoring agents 126, management packs 128, other software, lists of monitored servers 130, and other items shown in the Figures and/or discussed in the text may reside partially or entirely within one or more media 112, thereby configuring those media. In addition to processor(s) 110, memory 112, and a display 132, an operating environment may also include other hardware, such as buses, power supplies, and accelerators, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
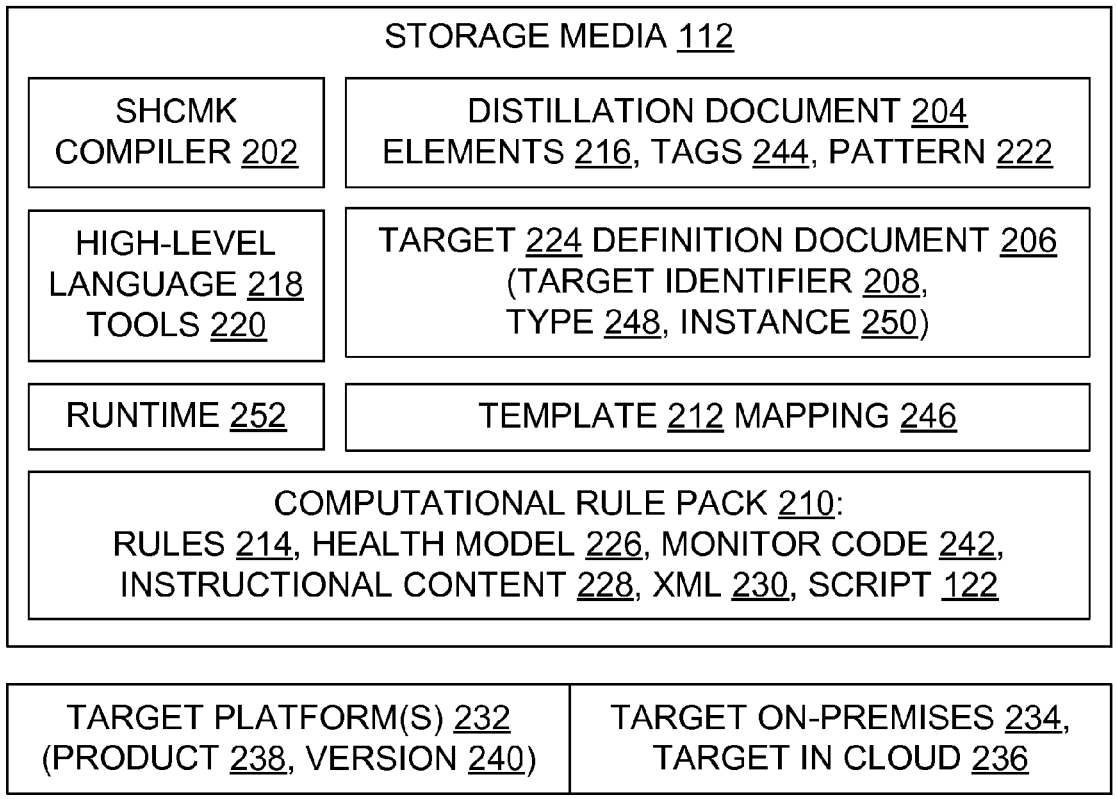
FIG. 2 is a block diagram illustrating aspects of pattern-based computational health and configuration monitoring in an example architecture.

FIG. 2 illustrates aspects of a pattern-based monitoring architecture which is suitable for use with some embodiments. Reference is also made to the other Figures. Briefly, in some embodiments a compiler 202 takes one or more SHCMK distillation documents 204, one or more target definition documents 206 with one or more target identifiers 208, and produces one or more TSRP (target-specific rule pack) documents 210. A target template 212 may also be input to the compiler 202. The TSRP documents 210 can then be applied to specific monitoring tools 120, 126 to monitor specific variants and versions of server 130 applications.

From a more detailed architectural perspective, some embodiments include a logical processor 110 and a memory 112 in operable communication with the logical processor. The system 102 is configured by circuitry, firmware, and/or software to perform pattern-based monitoring as described herein.

In some embodiments, an SHCMK distillation document 204 residing in the memory 112 has monitoring elements 216 declared 320 in a high-level computer language 218. In some embodiments, a distillation document 204 is written at least partially in XML (that is, in an XML language 218). The elements 216 provide at least one platform-nonspecific pattern 222 for monitoring computational health and/or computational configuration of a server 130 or other system 102.

In some embodiments, a target identification 336 residing in the memory specifies at least one target platform 232 to be monitored. In some, the target identification 336 identifies a SQL server installation. Other generation conditions 332 may also be satisfied 330 in some embodiments, e.g., conditions on what language 218 is used to declare 320 monitoring elements 216, and/or conditions 332 on what kind of server 130 is targeted.

In some embodiments, a monitoring knowledge compiler 202, such as an SHCMK compiler, also resides in the memory 112 and has code which upon execution will compile (e.g., parse 342, build 346 an internal representation, translate 350 to generate 308) the distillation document 204 and the target identification 336 as a collective input, and produce as an output a rule pack 210 that is specifically arranged to monitor computational health and/or computational configuration of the target platform 232. Some embodiments also include a template 212 residing in the memory 112 and containing a mapping 246 from the distillation document 204 to a particular identified target 224.

Some embodiments include the SHCMK or other rule pack 210 produced by the compiler 202. The rule pack 210 contains rules 214 for monitoring the target platform. In addition to rules 214, in some embodiments a rule pack 210 also includes rule pack components such as a health model 226, a monitor code 242 for monitoring a target, and/or a natural language instructional content 228. The instructional content 228 provides text, diagrams, and similar content directed at administrators 104, to help them diagnose and/or resolve health and/or configuration problems in a monitored target.

In some embodiments, the rule pack 210 generated 308 will be a management pack 128 for a database server 130 (e.g., a Microsoft® SQL Server® server), an email or calendaring server 130 (e.g., a Microsoft Exchange Server® server), an intranet or extranet server 130 (e.g., a Microsoft®SharePoint® server), or enterprise software or middleware server 130 (e.g., a Microsoft® BizTalk® server) (marks of Microsoft Corporation). Although particular Microsoft® server products 238 are listed as examples herein, other products 238 from Microsoft Corporation or from other vendors may also be targeted by some embodiments.

Some embodiments include an SHCMK runtime 252 which provides runtime support code. Efficiency and consistency are thus enhanced, because portions of the runtime code are shared by and invocable by multiple rule packs 210 for different target platforms 232.

In some embodiments, an administrator, developer, or other user 104 generates a rule pack 210, such as a management pack 128 or a set of best practices rules 214. The user indicates 302 by electronic input to an SHCMK compiler machine (a system 102 configured by an SHCMK compiler 202) an SHCMK distillation document 204 configuring 334 a computer-readable memory 112. The SHCMK distillation document 204 is not itself consumable by a familiar management tool 120, but is instead a high-level representation of monitoring knowledge in a form that is more concise, portable, and/or efficient than familiar management packs 128, for example. Distillation documents 204 are written in declarative form, rather than an imperative form. The SHCMK distillation document 204 has monitoring knowledge elements 216 which are declared 320 in a high-level computer language 218. This high-level language 218 may be defined in any suitable form, including by use of XSD and/or RELAX NG, for example.

XML's XSD (a.k.a. XML Schema) and RELAX NG are both general enough to define a high-level language 218 for an SHCMK distillation document 204, and they have facilities (language features, editing tools 220) for defining the language 218 in a clear, reasonably concise way. These language definitions can be used to help parse and validate distillation documents. XML is convenient in that many familiar tools 220 for manipulating XML documents exist. One could alternately define a language 218 using Backus-Naur Form (BNF), for example, for distillation documents 204, but that wouldn't be as convenient for developers because there are fewer contemporary support tools for BNF. Binary, hex, octal, etc. are low-level languages (not high-level languages 218), since humans have trouble interpreting them in meaningful ways.

In some embodiments, the SHCMK distillation document's monitoring elements 216 provide at least one platform-nonspecific pattern 222 for monitoring computational health and/or computational configuration. The monitoring elements 216 can be expressed as XML, for example. Although such input to the compiler 202 is an XML document, as opposed to an XML schema, the XML document complies with an XML schema. Other embodiments use an XML document 204 complying with a RELAX NG schema, or another representation.

The user 104 also denotes 304 a target identification 336 such as a target definition document 206 and/or target template 212, again by electronic input to the SHCMK compiler machine. The target identification 336 specifies at least one target 224 platform 232 to be monitored. In some embodiments, the user 104 provides a target definition document 206 to the compiler to define the possible targets 224. In some embodiments the target identification 336 includes a target type 248 and also includes a target instance 250. The target instance is an instance of the target type, and the target instance identifies a target product 238 and a target product version 240.

In some embodiments, this target definition document 206 is a separate XML document than the distillation document 204, with a distinct schema. When the compiler 202 is invoked by the user, the user provides this target definition document 206 as well as the name (identifier 208) of the target or targets 224 for which output is desired. The compiler 202 will then generate 308 target-specific rule packs 210 for each target selected. These target-specific rule packs comply with requirements of the monitoring tool 120 which will be using them to monitor the desired server applications.

In some embodiments, the SHCMK compiler 202 machine 102 computationally generates 308 an electronic digital SHCMK rule pack 210 from the SHCMK distillation document 204 and the target identification, and the rule pack is acquired 306 by the user, e.g., as file(s) accessible to the user and identified to the user by filename. The SHCMK rule pack 210 is specific to a target platform that is identified in the target identification 336, and the SHCMK rule pack includes 338 an implementation 340 of an SHCMK element 216 of the SHCMK distillation document 204. The implementation 340 is consumable by a familiar monitoring tool 120 to allow monitoring of the target platform consistent with the monitoring element 216. In some embodiments, the implementation 340 includes server management pack 128 XML 230 code and/or includes server management pack 128 script 122 code.

In some embodiments, the SHCMK compiler includes a preprocessor front end 344 which performs parsing 342 and builds 346 an abstract data tree or other internal representation 348 of the distillation element(s) 216. A back end 352 translates 350 the internal representation 348 into platform-specific rule pack(s) 210, using familiar mechanisms adapted to operate on monitoring knowledge described herein, for example. In some embodiments, a plug-in 312 or other mechanism is used to tailor 310 the SHCMK compiler back end 352 so it will generate 308 on-premises 234 rule packs 210, e.g., a management pack 128 for an on-premises database server 130. In some embodiments, the SHCMK compiler 202 is tailored 310 to generate 308 cloud-based 236 rule packs 210, e.g., management packs 128 for cloud-based servers 130.

In some embodiments, the distillation provides portable representation and use of server monitoring knowledge. For example, in some the SHCMK compiler 202 machine generates, from the same SHCMK monitoring element(s) 216, at least two different SHCMK rule packs 210 for respective different versions 240 of a particular target product 238. In some, the SHCMK compiler 202 machine generates, from the same SHCMK monitoring element(s) 216, at least two different SHCMK rule packs 210 for respective different target products 238.

Some embodiments deal specifically with server health and/or configuration monitoring knowledge ("SHCMK"), such as rules 214, health models 226, alert conditions, script 122 effects, and instructional content 228, for example. Monitoring knowledge may be represented at a level below the distillation in management packs 128 for database, email, intranet, middleware, and other servers 130. SHCMK management packs 128 may be platform-specific. Some embodiments deal with rule packs 210 in general, which includes SHCMK management packs 128 as well as other health and/or configuration monitoring rule files, regardless of whether they are specifically designed for monitoring servers.

In some embodiments, the distillation document 204 declares some particular group of the elements 216. The group of elements declared may meet a stated number-of-elements condition such as "at least one", "at least N", a range, "no more than N", or any of the foregoing in combination with including/excluding particular elements 216. Some examples of distillation document elements 216 are: a monitor alert type for code 242 which defaults to autoresolution; a monitor alert type for code 242 which defaults to alert on warning and will not necessarily to provide another alert when the monitored status goes from warning level to critical level; a textual instructional content 228 type for diagnosing and/or correcting undesired behavior in the target 224; a target attributes group for tailoring the rule pack to the target's installed/hardware capabilities and/or the target's particular configuration; a tag 244 and version attributes group for associating 324 a distillation's monitoring elements with target sets; a monitored item type for defining recognized monitored item identifiers 208; an event alert type for defining recognized event alert identifiers; a performance collection type for defining recognized performance item identifiers; a policy monitor type for defining recognized monitoring policy item identifiers; a threshold monitor type for defining recognized monitoring threshold value identifiers.

In some embodiments, a health monitor is a user-visible item in a monitoring tool 120 which indicates at least whether a certain aspect of a server application is healthy, and might also indicate other states such as a transition between being healthy and unhealthy. An alert is a user-visible item in a monitoring tool 120 which indicates that a specific problem has been detected while monitoring a server application. Health monitors and alerts may also include instructional information for operations staff on how to resolve the specific issue indicated by the health monitor or alert.

In some embodiments, tags 244 are user-defined keywords which indicate specific functionality to be monitored, specific technologies (such as local, cluster or cloud, on-premises vs. cloud), and so on. Targets defined in the target definition document 206 can include or exclude tags based on business requirements and/or on what technically can be monitored for that specific target.

In some embodiments, an SHCMK distillation document 204 contains one or more instances of patterns 222. These pattern instances comply with the SHCMK distillation's high-level language 218. The patterns 222 include (but are not limited to) general patterns for health monitors, a pattern which connects compliance of server application policies with health monitors, a pattern which correlates numerical thresholds of specific numerical data collected from monitoring server applications with various health states for a health monitor, a pattern which correlates specific kinds of events which have occurred during execution of a server application with specific alerts, and a pattern which identifies various numerical data sources (which typically contain performance information about a server application) that should be sampled and stored over time by the monitoring tool. Some monitoring tools 120 display such a series of gathered numerical data in a graph or chart.

Some embodiments use 322 a platform-specific target template 212 to map 246 at least one distillation document monitoring element 216 to a particular target platform 232 while generating the rule pack 210. For example, in some embodiments different templates 212 are used for on-premises versus cloud database servers.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, distillation documents 204 and target definition documents 206 may be stored on multiple devices/systems 102 in a networked cloud, the monitoring knowledge compiler 202 may run on yet other devices within the cloud, and the runtime 252 and rule packs 210 may configure the display through monitoring tools 120 on yet other cloud device(s)/system(s) 102.

Processes

Figure 3:
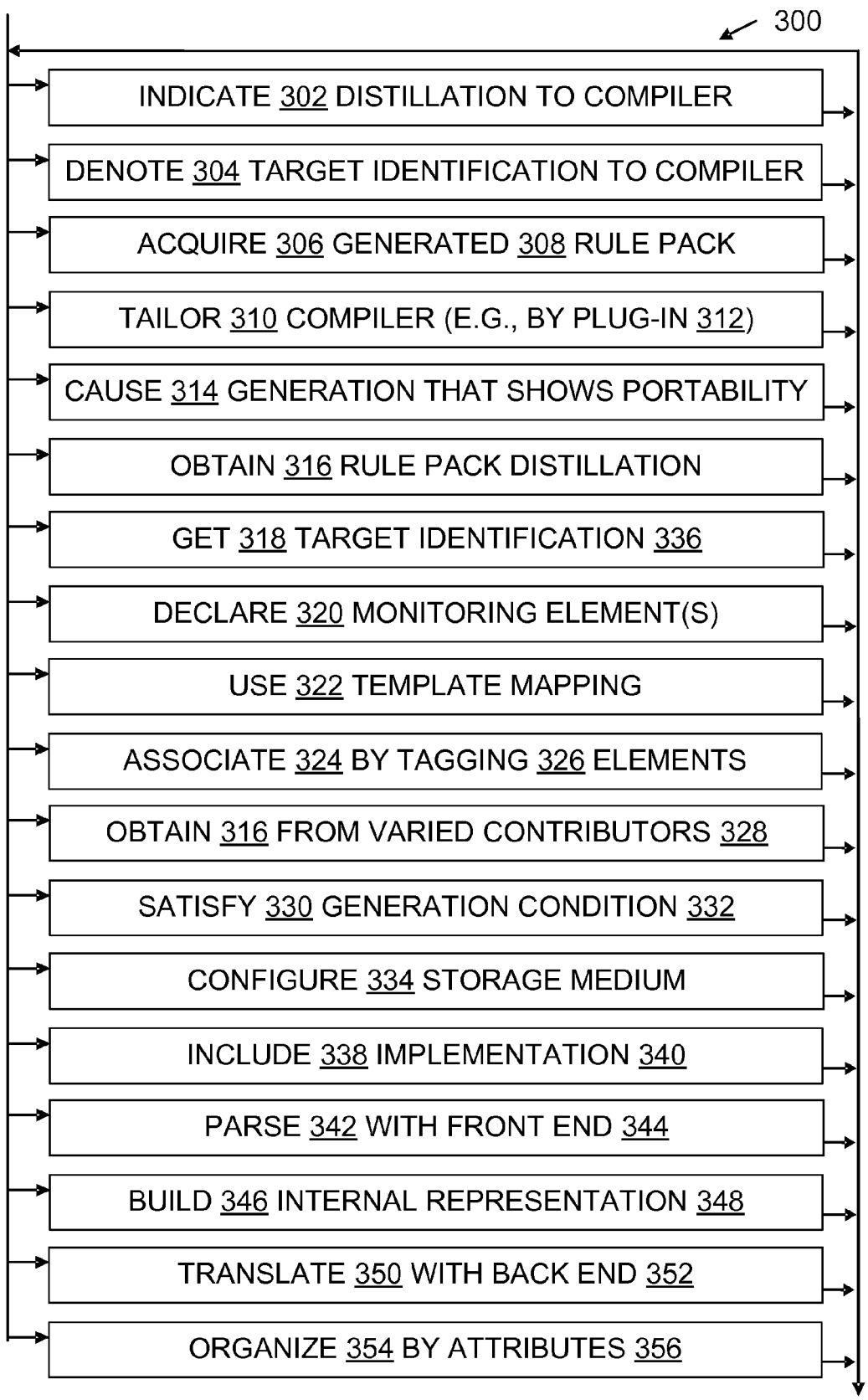
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by a monitoring knowledge compiler 202 under control of a script or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Some embodiments computationally generate 308 a rule pack 210. Some do this in part by obtaining 316 a rule pack distillation 204 configuring 334 a computer-readable memory, e.g., by reading a file from disk or from a network connection. The rule pack distillation 204 has monitoring elements 216 declared in a high-level computer language 218. In some embodiments, the monitoring elements individually and/or collectively provide at least one platform-nonspecific pattern 222 for generating computational rules 214 directed to assessing health and/or configuration of a system 102.

Some embodiments get 318 a digital target identification, e.g., through a user interface or from a file. In some, the target identification 336 specifies at least one server target platform 232, e.g., a calendaring server, database server, email server, enterprise software server, extranet server, intranet server, middleware server, or another server 130 identified herein or otherwise recognized as a server by one of skill in a computer art.

Some embodiments computationally generate 308 an electronic digital rule pack 210 from the rule pack distillation document 204 and a target identification document 206, e.g., by using familiar source-to-source language translation mechanisms adapted to generate a rule pack containing human-readable machine-parsable computational rules specific to the target platform.

Some embodiments associate 324 monitoring elements 216 with target sets by tagging 326 the monitoring elements. Even though monitoring elements 216 can be portable and concise in comparison to familiar management packs 128, over time the number and variety of monitoring elements in the distillation document(s) 204 may grow large enough that tags 244 or another grouping mechanism becomes helpful in organizing the elements 216. Monitoring elements 216 may be organized 354 according to attributes 356 such as the relevant products 238, relevant locations (e.g., local vs. cluster vs. cloud, or on-premise vs. cloud), contributor(s) 328, and so on. In some embodiments, the monitoring elements 216 are provided by various contributors 328, such as a target product vendor developer, a target product customer support technician, an independent consultant, an independent software vendor, and/or an administrator of a target product. Contributors 328 may also be users 104.

In some embodiments, tags 244 are used to identify particular features of a server application. The tags 244 are applied to pattern instances (e.g., SHCMK distillation document elements 216) which are only relevant for those specific features. Tagging may thus be helpful in monitoring product versions 240 or configuration variations (box, cloud, appliance) of a server application. Also, some monitoring tools 120 may support a reduced or enhanced set of features. Tagging 326 helps ensure that the correct pattern 222 instances are compiled and included 338 in the target rule pack output for those targets (and only those targets 224) which will be monitoring server application versions or variants which support those features. Tagging 326 also helps ensure that the correct pattern 222 instances are compiled and included in the target rule pack 210 output for server application features which are supported by a particular monitoring tool 120. This in turn helps ensure that the target rule pack output operates correctly when applied to a specific monitoring tool 120 that is monitoring a specific version of a specific variant of a server 130 application.

Computational rule pack generation 308 may be qualitatively different from manual creation of rule packs. For example, some generated 308 rule packs 210 show greater consistency between rule packs than manually written rule packs. Some generated 308 rule packs 210 are more concise than functionally interchangeable manually written rule packs. In many cases, generated 308 rule packs 210 are also produced more quickly than functionally interchangeable manually written rule packs once an infrastructure (e.g., a documented distillation 204 of monitoring knowledge, SHCMK compiler 202, target identification 336, and target template 212) is in place.

Configured Media

Some embodiments include a configured 334 computer-readable storage medium 112. Medium 112 may include disks (magnetic, optical, or otherwise), RAM, EEPROMS or other ROMs, and/or other configurable memory, as opposed to propagated signal media. The storage medium which is configured 334 may be in particular a removable storage medium 114 such as a CD, DVD, or flash memory. A general-purpose memory, which may be removable or not, and may be volatile or not, can be configured 334 into an embodiment using items such as distillation documents 204, target templates 212, and monitoring knowledge compilers 202, in the form of data 118 and instructions 116, read from a removable medium 114 and/or another source such as a network connection, to form a configured medium. The configured medium 112 is capable of causing 314 a computer system to perform process steps for transforming data through pattern-based health and/or configuration monitoring as disclosed herein. FIGS. 1 through 5 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

ADDITIONAL EXAMPLES

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from "Project T" documentation. Project T is technology being developed and implemented by Microsoft Corporation. Aspects of the Project T technology and/or documentation are consistent with or otherwise illustrate aspects of the embodiments described herein. However, it will be understood that Project T documentation and/or implementation choices do not necessarily constrain the scope of such embodiments, and likewise that Project T technology and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

In broad strokes, note that existing manageability platforms require very low level instructions for identifying health and configuration problems and provide extremely inefficient ways of expressing information to be presented to operators when those problems occur. Some Project T approaches provide a high-level, portable representation of knowledge that is used to identify health and configuration problems and a compact, concise way to express content to help operators to resolve those problems.

In addition, Project T includes information about various ways to target health and configuration knowledge. Targets represent information about which manageability tool 120 will use the knowledge, and which product, product version, and product form is being targeted. A knowledge compiler 202 combines the portable knowledge (e.g., in a distillation document 204), the target information (e.g., in a target definition document 206), and templates (e.g., templates 212) for a target 224, and generates some or all appropriate artifacts (typically management pack files) used by the target 224 to perform the targeted health and configuration monitoring as desired.

These artifacts (e.g., computational rule packs 210) are typically loaded into management servers which then disperse them to health agents 126. These agents then invoke the monitoring workflows described by the high-level knowledge (e.g., patterns 222). The workflows invoke runtime 252 components that centralize code which gathers health and configuration information, and caches gathered information so that it can be reused by multiple workflows. The runtime 252 is designed for reusability and extensibility to reduce or eliminate redundant code which might repeatedly gather similar information from the products being monitored, over and over again.

Because the translation (e.g., compilation 342, 346, 350) of the high-level knowledge into actionable artifacts is automatic (via the knowledge compiler 202), a consistent experience is delivered to all customers across all supported manageability tools, and across all supported versions and forms of a product. A tagging 326 scheme is used to group sets of knowledge elements 216. The appropriate set of knowledge is selected for each target based on the tags in the knowledge and tag selectors expressed in the target definitions 206, 212. In this way appropriate sets of knowledge are delivered to each target 224 based on the business requirements for that specific target without necessarily using multiple copies of the knowledge.

Figure 4:
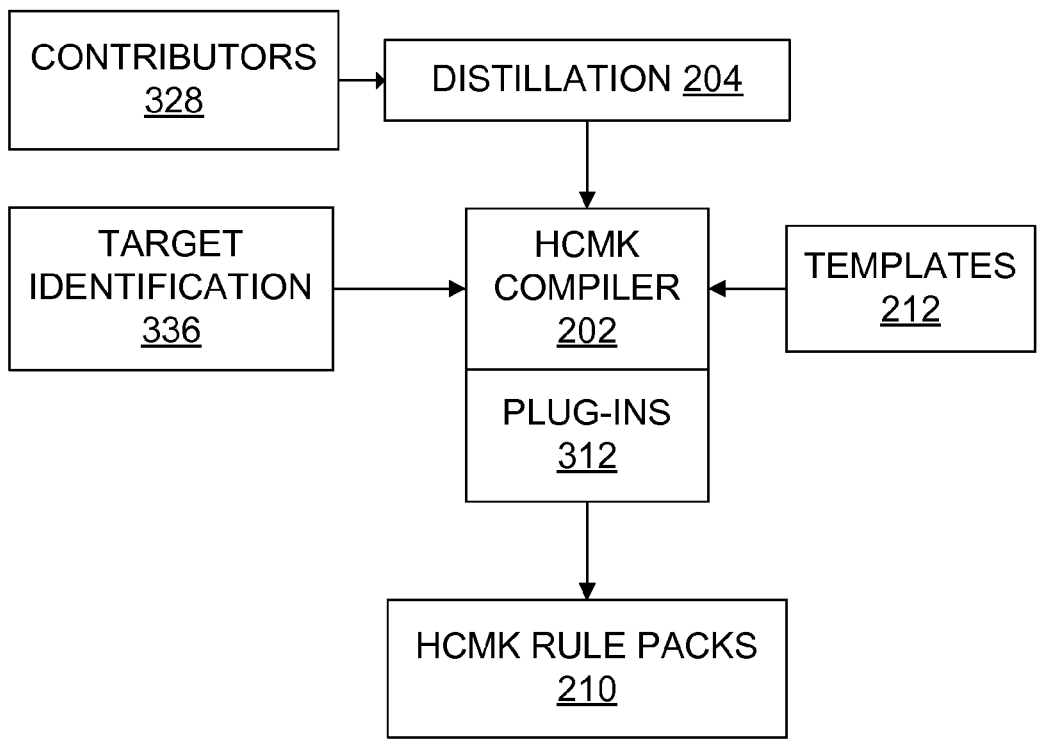
FIG. 4 is a data flow diagram illustrating aspects of pattern-based computational health and configuration monitoring in another architecture.

In FIG. 4, knowledge workers (called contributors 328) create, change, and organize monitoring knowledge using a knowledge editing tool, e.g., an editor for RELAX NG, JSON, etc. The knowledge is represented at least partially in a high-level language 218 as discussed above. Knowledge about targets (target identification 336, target templates 212, etc.) may be kept in a targets database or one or more files, for example, and knowledge that is not specific to a particular target version or target product may likewise be kept in a knowledge elements 216 database or one or more files. Contributed knowledge about health and/or configuration monitoring can be reviewed by other contributors. After new knowledge or changes to existing knowledge is approved during the review process, the knowledge can be compiled by the knowledge compiler 202 for all known targets, e.g., through an automated compilation process, producing artifacts (rule packs 210) for each target (e.g., Microsoft® System Center Operations Manager and/or other target tools 120).

Figure 5:
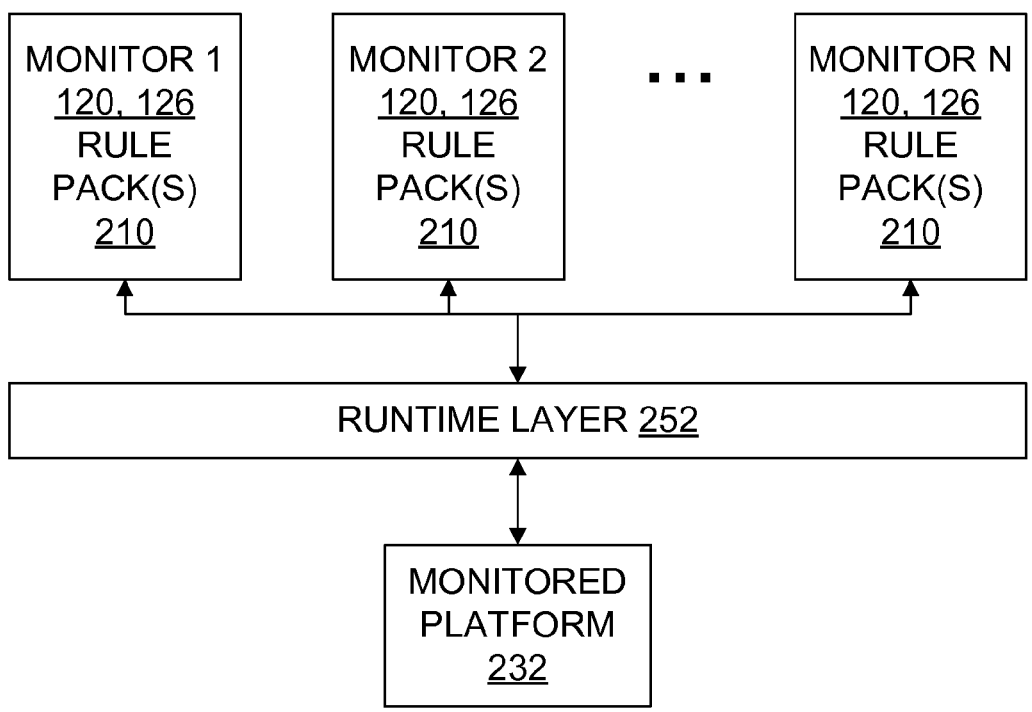
FIG. 5 is a data flow diagram illustrating use of a runtime for pattern-based computational health and configuration monitoring.

As further illustrated in FIG. 5, artifacts (rule packs 210) produced for each target 224 are installed into the appropriate monitoring platforms (with tools 120). These monitoring platforms then have agents 126 which receive the artifacts and invoke appropriate components in the runtime 252 layer to gather information for monitoring the health and configuration of the monitored product. The runtime layer components gather information from the monitored product and cache that information in the runtime so that multiple workflows across multiple monitoring platforms can reuse this cached information without significant impact to the product being monitored.

In some Project T approaches, knowledge is defined as information about how to detect a problem, the cause of the problem, a description of the problem, and how to correct the problem. A knowledge implementation is a declarative and/or code based representation of such knowledge. A particular knowledge implementation contains a particular subset of all the knowledge available and is targeted at a specific manageability platform and usage scenario. In this context, manageability is the ability to validate and examine the configuration and health of a system (e.g., a Microsoft® SQL Server® system, marks of Microsoft Corporation), and the ability to take either pro-active or corrective actions to address issues found. A manageability platform is a tool or product designed to help operations staff implement manageability, e.g., Microsoft® System Center Operations Manager (SCOM), cloud-based services which monitor on-premises servers using a health agent and having a web portal for a customer to monitor and examine health-related issues, configuration analyzers, performance profilers, and disk space monitoring and CPU load monitoring tools. In this context, policy-based management enforces configuration of servers based on policy that is set by database administrators. A target may be a combination of a specific manageability platform and a particular subset of knowledge. Targets may also include specific versions of the server application being monitored and the context (e.g., location) where that server application is deployed (e.g., appliance, box, cloud).

Some Project T technologies do not change existing manageability platforms or tools 120. Instead they focus on providing a concise and powerful representation of diagnostic information and diagnostic models which can be utilized by multiple manageability platforms combined with a centralization of the code which analyzes the configuration and health of those models. This approach would not change the form of SCOM management packs or BPA (Best Practices Analyzer) rule sets. Instead it would improve the way knowledge is modeled, and the way knowledge implementations (the contents of management packs and BPA rule sets) are produced, by using distillation documents 204 in high-level languages, a knowledge compiler 202, and other aspects discussed herein.

In some Project T approaches, manageability platforms acquire information to assess the configuration and health of server by using a thin layer of shell scripts (e.g., Windows PowerShell™ scripts, mark of Microsoft Corporation) in the knowledge implementations which invoke centralized custom cmdlets written, e.g., in C#. These cmdlets interrogate the server using, e.g., management instrumentation, server management objects, and query languages as well as access various information sources such as event logs, registry entries, file properties, performance counters, and service status. To the extent a tool 120 has support for these sources, the tool's facilities would be used for management pack knowledge implementations. However when custom scripts would have been used in the management pack, that form of data gathering would be replaced by invoking the centralized cmdlets. This yields simplified management packs which are either purely declarative or which simply invoke external components. If a target platform has no specific capabilities for gathering data, the centralized cmdlets of the runtime 252 would be used to examine all sources of data for its rule packs, with a clean separation between data gathering (which would be done by the centralized cmdlets) and the rule logic.

In some Project T technologies, knowledge is primarily represented by a collection of XML documents. Some design goals include ensuring that the XML complying with the knowledge schema is simple to author in an XML editor, and that the XML is easily transformable into a SCOM management pack 128 and also easily transformable to the XML components of an MBCA v2 (Microsoft® Baseline Configuration Analyzer) rule pack.

In some Project T technologies, specific information about particular targets is stored in the Targets database, not the Knowledge database. Also, the Targets database contains templates which would be used to map the knowledge XML into the XML required by that target.

In some Project T technologies, the schema is powerful enough to express all the patterns used in both the SQL Server® management pack and the SQL Server® BPA (mark of Microsoft Corporation). Support for other manageability platforms may also be present, or added over time.

In some Project T technologies, knowledge is tagged. The tags help categorize different sets of knowledge, and help locate and understand knowledge from the large knowledge repository. Some tags are built-in and have very specific meanings. Other tags can be added on an ad-hoc basis.

In some Project T technologies, a template 212 includes portions which are discussed and illustrated below. Some examples include preamble and postamble XML that would be added to either a SCOM MP or MBCA v2 rule pack to make it valid for that platform. A preamble for one cloud-based (Microsoft Azure™, mark of Microsoft Corporation) management pack template reads as follows:

```
<ManagementPack xmlns:xsd="http://www.w3.org/2001/
XMLSchema"
xmlns:maml="http://schemas.microsoft.com/maml/2004/10"
xmlns:doc="http://schemas.microsoft.com/maml/internal"
xmlns:xsi="http://www.w3.org/2001/XMLSchema-instance"
xmlns:tk="http://schemas.microsoft.com/sqlserver/2010/12/
HealthModel/Template.xsd" xmlns:xsl="http://www.w3.org/1999/XSL/
Transform">
```

Similarly, a preamble for a SCOM management pack template reads as follows:

```
<ManagementPack xmlns:xsd="http://www.w3.org/2001/XMLSchema"
xmlns:xsi="http://www.w3.org/2001/XMLSchema-instance"
xmlns:tk="http://schemas.microsoft.com/sqlserver/2010/12/HealthModel/
Template.xsd">
```

The URLs and other hyperlinks or browser-executable code used above, or appearing anywhere else in this document, are provided as only examples per se. They are not intended to incorporate matter into this disclosure by reference to the contents of the sites named in the URLs. Applicants do not intend any hyperlinks herein to be active links.

Continuing now the discussion of template 212 in some Project T technologies, a manifest may be included. For example, in the cloud-based template, one manifest reads as follows:

```
<Manifest>
    <Identity>
        <tk:elements name="IdentityInfo" />
    </Identity>
    <Name>
        <tk:value name="ShortManagementPackName" />
    </Name>
    <References>
        <Reference Alias="System">
            <ID>System.Library</ID>
            <Version>6.1.7221.0</Version>
            <PublicKeyToken>31bf3856ad364e35</PublicKeyToken>
        </Reference>
        <Reference Alias="SystemHealth">
            <ID>System.Health.Library</ID>
            <Version>6.1.7221.0</Version>
            <PublicKeyToken>31bf3856ad364e35</PublicKeyToken>
        </Reference>
        <Reference Alias="SystemPerf">
            <ID>System.Performance.Library</ID>
            <Version>6.1.7221.0</Version>
            <PublicKeyToken>31bf3856ad364e35</PublicKeyToken>
        </Reference>
        <Reference Alias="SC">
            <ID>Microsoft.SystemCenter.Library</ID>
            <Version>6.1.7221.0</Version>
            <PublicKeyToken>31bf3856ad364e35</PublicKeyToken>
        </Reference>
        <Reference Alias="SCDW">
            <ID>Microsoft.SystemCenter.DataWarehouse.Library</ID>
```

```
            <Version>6.1.7221.0</Version>
            <PublicKeyToken>31bf3856ad364e35</PublicKeyToken>
        </Reference>
        <Reference Alias="OM">
            <ID>Microsoft.SystemCenter.OperationsManager.Library</ID>
            <Version>6.1.7221.0</Version>
            <PublicKeyToken>31bf3856ad364e35</PublicKeyToken>
        </Reference>
        <Reference Alias="Windows">
            <ID>Microsoft.Windows.Library</ID>
            <Version>6.1.7221.0</Version>
            <PublicKeyToken>31bf3856ad364e35</PublicKeyToken>
        </Reference>
    </References>
</Manifest>
```

A similar manifest, but for on-premises target management, appears in the template 212 for the SCOM management pack:

```
<Manifest>
    <Identity>
        <tk:elements name="IdentityInfo" />
    </Identity>
    <Name><tk:value name="ShortManagementPackName" /></Name>
    <References>
        <Reference Alias="System">
            <ID>System.Library</ID>
            <Version>6.0.5000.0</Version>
            <PublicKeyToken>31bf3856ad364e35</PublicKeyToken>
        </Reference>
        <Reference Alias="SystemHealth">
            <ID>System.Health.Library</ID>
            <Version>6.0.5000.0</Version>
            <PublicKeyToken>31bf3856ad364e35</PublicKeyToken>
        </Reference>
        <Reference Alias="SystemPerf">
            <ID>System.Performance.Library</ID>
            <Version>6.0.5000.0</Version>
            <PublicKeyToken>31bf3856ad364e35</PublicKeyToken>
        </Reference>
        <Reference Alias="Windows">
            <ID>Microsoft.Windows.Library</ID>
            <Version>6.0.5000.0</Version>
            <PublicKeyToken>31bf3856ad364e35</PublicKeyToken>
        </Reference>
        <Reference Alias="SC">
            <ID>Microsoft.SystemCenter.Library</ID>
            <Version>6.0.5000.0</Version>
            <PublicKeyToken>31bf3856ad364e35</PublicKeyToken>
        </Reference>
        <Reference Alias="SQL">
            <ID>Microsoft.SQLServer.Library</ID>
            <Version>6.1.314.36</Version>
            <PublicKeyToken>31bf3856ad364e35</PublicKeyToken>
        </Reference>
        <Reference Alias="SCDW">
            <ID>Microsoft.SystemCenter.DataWarehouse.Library</ID>
            <Version>6.0.5000.0</Version>
            <PublicKeyToken>31bf3856ad364e35</PublicKeyToken>
        </Reference>
        <Reference Alias="SQL2008Core">
            <ID>Microsoft.SQLServer.2008.Discovery</ID>
            <Version>6.1.314.36</Version>
            <PublicKeyToken>31bf3856ad364e35</PublicKeyToken>
        </Reference>
        <!--Report Library Reference-->
        <Reference Alias="ReportLibrary">
            <ID>Microsoft.SystemCenter.DataWarehouse.Report.Library</ID>
            <Version>6.0.5000.0</Version>
            <PublicKeyToken>31bf3856ad364e35</PublicKeyToken>
        </Reference>
    </References>
</Manifest>
```

Each of these example templates also contains a <Type-Definitions> portion. However, the cloud-based template contains <EntityTypes> not found in the SCOM template, including <ClassTypes> and <RelationshipTypes>, namely:

```
<ClassTypes>
    <ClassType ID="Microsoft.SqlAzure.ServerRole"
Accessibility="Public" Base="System!System.Service" Hosted="false"
Abstract="true" Singleton="false">
        <Property ID="ServerName" Type="string" Key="true" />
        <Property ID="PerformanceCounterObject" Type="string" />
    </ClassType>
    <ClassType ID="Microsoft.SqlAzure.DBEngine"
Accessibility="Public" Base="Microsoft.SqlAzure.ServerRole"
Hosted="false" Abstract="false" Singleton="false">
        <Property ID="Version" Type="string" />
        <Property ID="Edition" Type="string" />
    </ClassType>
    <ClassType ID="Microsoft.SqlAzure.ReportingServices"
Accessibility="Public" Base="Microsoft.SqlAzure.ServerRole"
Hosted="false" Abstract="true" Singleton="false">
        <Property ID="Version" Type="string" />
        <Property ID="Edition" Type="string" />
    </ClassType>
    <ClassType ID="Microsoft.SqlAzure.AnalysisServices"
Accessibility="Public" Base="Microsoft.SqlAzure.ServerRole"
Hosted="false" Abstract="true" Singleton="false">
        <Property ID="Version" Type="string" />
        <Property ID="Edition" Type="string" />
    </ClassType>
    <ClassType ID="Microsoft.SqlAzure.Database"
Accessibility="Public" Base="System!System.Database"
Hosted="true" Abstract="false" Singleton="false">
        <Property ID="DatabaseName" Type="string" Key="true" />
        <Property ID="DatabaseSizeQuota" Type="string" />
        <!-- add the service broker guid if it exists -->
    </ClassType>
    <ClassType ID="Microsoft.SqlAzure.Database.Master"
Accessibility="Public" Abstract="false" Base=
"Microsoft.SqlAzure.Database" Hosted="true" Singleton="false" />
    <ClassType ID="Microsoft.SqlAzure.Database.User"
Accessibility="Public" Abstract="false"
Base="Microsoft.SqlAzure.Database" Hosted="true"
Singleton="false" />
    <ClassType ID="Microsoft.SqlAzure.InstanceGroup"
Accessibility="Public" Base="System!System.Group" Hosted="false"
Abstract="false" Singleton="true"/>
</ClassTypes>
<RelationshipTypes>
    <RelationshipType ID="Microsoft.SqlAzure.DBEngineHostsDatabase"
Accessibility="Public" Base="System!System.Hosting" Abstract="false">
        <Source>Microsoft.SqlAzure.DBEngine</Source>
        <Target>Microsoft.SqlAzure.Database</Target>
    </RelationshipType>
    <RelationshipType
ID="Microsoft.SqlAzure.InstanceGroupContainsDBEngine"
Accessibility="Public" Base="System!System.Containment"
Abstract="false">
        <Source>Microsoft.SqlAzure.InstanceGroup</Source>
        <Target>Microsoft.SqlAzure.DBEngine</Target>
    </RelationshipType>
</RelationshipTypes>
```

The cloud-based template also contains a <SecureReferences> portion that is not used in the SCOM on-premises template:

```
<SecureReferences>
    <SecureReference ID="Microsoft.SqlAzure.SQLDefaultAccount"
Accessibility="Public" Context="System!System.Entity" />
    <SecureReference ID="Microsoft.SqlAzure.DefaultTaskAccount"
Accessibility="Public" Context="System!System.Entity" />
</SecureReferences>
```

Each of these example templates contains several <ModuleTypes> entries. One from the cloud-based template is given below as an illustration. In this example, a <Configuration> section, an <OverrideableParameters> section, and a script body have been extracted, and are listed separately, to improve legibility and conform with patent office document format requirements:

```
<DataSourceModuleType
ID="Microsoft.SqlAzure.UserDatabaseDiscovery.DS" Accessibility="Public"
Batching="false">
    <Configuration> ... see below </Configuration>
    <OverrideableParameters> ... see below </OverrideableParameters>
    <ModuleImplementation Isolation="Any">
        <Composite>
            <MemberModules>
                <DataSource ID="Scheduler"
TypeID="System!System.SimpleScheduler">
                    <IntervalSeconds>$Config/IntervalSeconds$</IntervalSeconds>
                    <SyncTime>$Config/SyncTime$</SyncTime>
                </DataSource>
                <ProbeAction ID="Probe"
TypeID="Windows!Microsoft.Windows.PowerShellPropertyBagProbe">
                    <ScriptName>SQLAzureUserDatabaseDiscoveryScript</ScriptName>
                    <ScriptBody> ... see below </ScriptBody>
                    <SnapIns>
                        <SnapIn>Microsoft.SqlServer.HealthObjectModel</SnapIn>
                    </SnapIns>
                    <Parameters>
                        <Parameter>
                            <Name>ServerName</Name>
<Value>$Target/Property[Type="Microsoft.SqlAzure.ServerRole"]/ServerName$</Value>
                        </Parameter>
                        <Parameter>
                            <Name>UserName</Name>
<Value>$RunAs[Name="Microsoft.SqlAzure.SQLDefaultAccount"]/UserName$</Value>
                        </Parameter>
                        <Parameter>
                            <Name>Password</Name>
```

```
<Value>$RunAs[Name="Microsoft.SqlAzure.SQLDefaultAccount"]/Password$</V
alue>
                        </Parameter>
                    </Parameters>
                    <TimeoutSeconds>$Config/TimeoutSeconds$</TimeoutSeconds>
                </ProbeAction>
                <ConditionDetection ID="Mapper"
TypeID="System!System.Discovery.ClassSnapshotDataMapper">
                    <ClassId>$Config/ClassId$</ClassId>
                    <InstanceSettings>$Config/InstanceSettings$</InstanceSettings>
                </ConditionDetection>
            </MemberModules>
            <Composition>
                <Node ID="Mapper">
                    <Node ID="Probe">
                        <Node ID="Scheduler" />
                    </Node>
                </Node>
            </Composition>
        </Composite>
    </ModuleImplementation>
    <OutputType>System!System.Discovery.Data</OutputType>
</DataSourceModuleType>
```

The <Configuration> and the <OverrideableParameters> section extracted from the example above are shown below. As with other sections of the template 212, there are only illustrations, and other code may also be used in accordance with Project T technology and/or as part of an embodiment as claimed.

```
<Configuration>
    <IncludeSchemaTypes>
<SchemaType>System!System.Discovery.MapperSchema</SchemaType>
    </IncludeSchemaTypes>
    <xsd:element minOccurs="0" maxOccurs="1"
name="IntervalSeconds" type="xsd:integer" />
    <xsd:element minOccurs="1" maxOccurs="1"
name="TimeoutSeconds" type="xsd:integer" />
    <xsd:element minOccurs="0" maxOccurs="1"
name="SyncTime" type="xsd:string" />
    <xsd:element minOccurs="1" maxOccurs="1"
```

-continued

```
name="ClassId" type="xsd:string" />
    <xsd:element minOccurs="1" maxOccurs="1"
name="InstanceSettings" type="SettingsType" />
</Configuration>
<OverrideableParameters>
    <OverrideableParameter ID="IntervalSeconds"
Selector="$Config/IntervalSeconds$" ParameterType="int" />
    <OverrideableParameter ID="TimeoutSeconds"
Selector="$Config/TimeoutSeconds$" ParameterType="int" />
</OverrideableParameters>
```

The <ScriptBody> extracted from the example above is shown below. Note that it is not necessary for every module implementation to include a script, and conversely, a given module implementation may include multiple scripts. Also, as with other code examples, some white space has been removed to aid legibility and/or conform with patent office document format requirement:

```
<ScriptBody>
    <![CDATA[
param($ServerName, $UserName, $Password)
        $scriptApi = new-object -comObject "MOM.ScriptAPI"
        # $scriptApi.LogScriptEvent('AccessDatabaseInformation', 4, 2,
"Enter user database discovery script serverName=$ServerName,
UserName=$UserName, Password=$Password")
    foreach ($database in (get-clouddatabases -ServerName "$ServerName"
-UserName "$UserName" -Password "$Password"))
        {
            $bag = $scriptApi.CreatePropertyBag( )
            $bag.AddValue("DatabaseName", $database.UniqueName)
            $bag.AddValue("DatabaseSizeQuota", $database.DBSizeQuota)
            $name = $database.UniqueName
            $quota = $database.DBSizeQuota
            $scriptApi.LogScriptEvent('AccessDatabaseInformation', 5, 2,
"Found cloud database $name with size quota $quota.")
            $bag
        }
        $bag ]]>
</ScriptBody>
```

The cloud-based template example also includes a <WriteActionModuleType> that is not present in the SCOM template example:

```
<WriteActionModuleType ID="Microsoft.SqlServer.SetCacheIntervals" Accessibility="Public">
    <Configuration>
        <xsd:element name="MonitoringInterval" type="xsd:string" />
        <xsd:element name="DiscoveryInterval" type="xsd:string" />
    </Configuration>
    <OverrideableParameters>
        <OverrideableParameter ID="MonitoringInterval" ParameterType="string" Selector="$Config/MonitoringInterval$" />
        <OverrideableParameter ID="DiscoveryInterval" ParameterType="string" Selector="$Config/DiscoveryInterval$" />
    </OverrideableParameters>
    <ModuleImplementation>
        <Composite>
            <MemberModules>
                <WriteAction ID="SetCacheIntervals" TypeID="Windows!Microsoft.Windows.PowerShellWriteAction">
                    <ScriptName>SetCacheIntervals.ps1</ScriptName>
                    <ScriptBody>
                        <![CDATA[
                            Param($monitorValue, $discoveryValue)
                            Set-CacheRefreshIntervals $monitorValue $discoveryValue
                        ]]>
                    </ScriptBody>
                    <SnapIns>
                        <SnapIn>Microsoft.SqlServer.HealthObjectModel</SnapIn>
                    </SnapIns>
                    <Parameters>
                        <Parameter>
                            <Name>MonitorValue</Name>
                            <Value>$Config/MonitoringInterval$</Value>
                        </Parameter>
                        <Parameter>
                            <Name>DiscoveryValue</Name>
                            <Value>$Config/DiscoveryInterval$</Value>
                        </Parameter>
                    </Parameters>
                    <TimeoutSeconds>120</TimeoutSeconds>
                    <StrictErrorHandling>false</StrictErrorHandling>
                </WriteAction>
            </MemberModules>
            <Composition><Node ID="SetCacheIntervals" /></Composition>
        </Composite>
    </ModuleImplementation>
    <InputType>System!System.BaseData</InputType>
</WriteActionModuleType>
```

Both example templates include a <MonitorTypes> section with monitor elements. For instance, the example SCOM template includes the following:

```
<UnitMonitorType ID="Microsoft.SqlServer.DatabasePolicyMonitorType" Accessibility="Internal" RunAs="SQL!Microsoft.SQLServer.SQLDefaultAccount">
    <MonitorTypeStates> <MonitorTypeState ID="Good" /> <MonitorTypeState ID="Error" /> </MonitorTypeStates>
    <Configuration> <xsd:element name="ConnectionString" type="xsd:string" /> <xsd:element name="PolicyName" type="xsd:string" /> <xsd:element name="DatabaseName" type="xsd:string" /> <xsd:element name="UsePolicyStore" type="xsd:boolean" /> <xsd:element name="IntervalSeconds" type="xsd:integer"/> <xsd:element name="SyncTime" type="xsd:string"/> <xsd:element name="TimeoutSeconds" type="xsd:integer"/> <xsd:eleme nt name="StrictErrorHandling" type="xsd:boolean" minOccurs="0" maxOccurs="1"/> </Configuration>
    <OverrideableParameters> <OverrideableParameter ID="IntervalSeconds" Selector="$Config/IntervalSeconds$" ParameterType="int"/> <OverrideableParameter ID="SyncTime" Selector="$Config/SyncTime$" ParameterType="string"/> <OverrideableParameter ID="TimeoutSeconds" Selector="$Config/TimeoutSeconds$" ParameterType="int"/> </OverrideableParameters>
    <MonitorImplementation> <MemberModules>
        <DataSource ID="DatabasePolicyDataSource"
```

```
TypeID="Microsoft.SqlServer.DatabasePolicyDataSourceType">
            <ConnectionString>$Config/ConnectionString$</ConnectionString>
            <PolicyName>$Config/PolicyName$</PolicyName>
            <DatabaseName>$Config/DatabaseName$</DatabaseName>
            <UsePolicyStore>$Config/UsePolicyStore$</UsePolicyStore>
            <IntervalSeconds>$Config/IntervalSeconds$</IntervalSeconds>
            <SyncTime>$Config/SyncTime$</SyncTime>
            <TimeoutSeconds>$Config/TimeoutSeconds$</TimeoutSeconds>
<StrictErrorHandling>$Config/StrictErrorHandling$</StrictErrorHandling>
        </DataSource>
        <ConditionDetection ID="FilterGood"
TypeID="System!System.ExpressionFilter">
            <Expression> <SimpleExpression>
                <ValueExpression>
                    <XPathQuery>Property[@Name='PolicyResult']</XPathQuery>
                </ValueExpression>
                <Operator>Equal</Operator>
                <ValueExpression>
                    <Value Type="Boolean">true</Value> </ValueExpression>
            </SimpleExpression> </Expression> </ConditionDetection>
        <ConditionDetection ID="FilterError"
TypeID="System!System.ExpressionFilter">
            <Expression> <SimpleExpression>
                <ValueExpression>
                    <XPathQuery>Property[@Name='PolicyResult']</XPathQuery>
                </ValueExpression>
                <Operator>NotEqual</Operator>
                <ValueExpression>
                    <Value Type="Boolean">true</Value> </ValueExpression>
            </SimpleExpression> </Expression>
        </ConditionDetection> </MemberModules>
        <RegularDetections> <RegularDetection MonitorTypeStateID="Good">
            <Node ID="FilterGood">
                <Node ID="DatabasePolicyDataSource" /> </Node>
        </RegularDetection>
        <RegularDetection MonitorTypeStateID="Error">
            <Node ID="FilterError">
                <Node ID="DatabasePolicyDataSource" /> </Node>
        </RegularDetection> </RegularDetections> </MonitorImplementation>
    </UnitMonitorType>
```

Unit Monitors are referenced, e.g., in the following section of the example SCOM template; the cloud-based example template also contains <Monitors>:

```
<Monitoring>
    <Rules>
        <tk:elements name="Rules" /> </Rules>
    <Monitors>
        <tk:elements name="AggregateMonitors" />
        <tk:elements name="UnitMonitors" /> </Monitors>
</Monitoring>
```

Both templates may contain other sections, e.g., <Views> definitions for user interfaces, images, <LanguagePacks>, and <PresentationTypes>. The following is from the example SCOM template:

```
<PresentationTypes>
  <UIPageSets>
    <UIPageSet
ID="Microsoft.SQLServer.DBSizeOptimizedPerfProvider.PageSet"
TypeDefinitionID="Microsoft.SqlServer.-
DatabaseOptimizedPowerShellPerformanceDataSourceType">
      <UIPageReferences>
        <UIPageReference
ID="Microsoft.SQLServer.DBSizeOptimizedPerfProvider.PageSet.-
Reference1"
PageID="System!System.SimpleSchedulerPage">
          <InputParameters />
          <InputTransform>
            <xsl:stylesheet version="1.0"
xmlns:xsl="http://www.w3.org/1999/XSL/Transform">
              <xsl:output method="xml" indent="yes"
omit-xml-declaration="yes" />
              <xsl:template match="/">
                <xsl:element name="SimpleReccuringSchedule">
                  <xsl:element name="Interval">
                    <xsl:value-of select="IntervalSeconds" />
                  </xsl:element>
                  <xsl:if test="boolean(string-length(SyncTime))">
                    <xsl:copy-of select="SyncTime" />
                  </xsl:if>
                </xsl:element>
              </xsl:template>
            </xsl:stylesheet>
          </InputTransform>
        </UIPageReference>
        <UIPageReference
ID="Microsoft.SQLServer.DBSizeOptimizedPerfProvider.-
PageSet.Reference2"
PageID="SystemPerf!System.Performance.OptimizedCollectionPage">
          <InputParameters />
          <InputTransform />
        </UIPageReference>
      </UIPageReferences>
    </UIPageSet>
<LanguagePacks>
  <tk:elements name="LanguagePacks" />
</LanguagePacks>
```

The cloud-based example template also includes <Templates> for locating templates, such as the example below. Sections of this example listing have been extracted, to improve legibility and confirm with patent office format requirements, and are provided and discussed separately.

```
<Templates>
  <Template ID=
  "Microsoft.SqlAzure.Template.SQLAzureServerDiscovery">
    <Configuration>
      <xsd:element name="Name" type="xsd:string" />
      <xsd:element name="Description" type="xsd:string" />
      <xsd:element name="ServerName" type="xsd:string" />
      <xsd:element name="RunAsAccount" type="xsd:string" />
      <xsd:element name="ProxyAgentComputerPrincipalName"
type="xsd:string"/>
      <xsd:element name="TemplateIdString" type="xsd:string" />
    </Configuration>
    <References> ... see below </References>
    <Implementation>
      <TypeDefinitions>
        <EntityTypes> <ClassTypes>
          <ClassType ... see below </ClassTypes> </EntityTypes>
      </TypeDefinitions>
      <Monitoring>
        <Discoveries> ... see below </Discoveries>
        <Overrides>
          <SecureReferenceOverride
ID="Microsoft.SqlAzure.SQLDefaultAccount.$TemplateConfig/
TemplateIdString$.Override"
Context="Microsoft.SqlAzure.DBEngine.$TemplateConfig/
TemplateIdString$"
Enforced="false"
SecureReference="$Reference/
Self$Microsoft.SqlAzure.SQLDefaultAccount">
            <Value>$TemplateConfig/RunAsAccount$</Value>
          </SecureReferenceOverride>
        </Overrides>
      </Monitoring>
      <LanguagePacks>
        <LanguagePack ID="ENU" IsDefault="true">
          <DisplayStrings> ... see below </DisplayStrings>
        </LanguagePack>
      </LanguagePacks>
    </Implementation>
  </Template>
</Templates>
```

A <References> section extracted from the listing above provides reference identifiers for use in the code:

```
<References>
  <Reference ID="Self" />
  <Reference ID="System" />
  <Reference ID="SystemPerf" />
  <Reference ID="SC" />
  <Reference ID="SCDW" />
  <Reference ID="SystemHealth" />
  <Reference ID="Windows" />
</References>
```

A <ClassType> section extracted from the listing above provides locations for template configuration information used in the code:

```
<ClassType
ID="Microsoft.SqlAzure.DBEngine.$TemplateConfig/TemplateIdString$"
Accessibility="Internal" Abstract="false"
Base="$Reference/Self$Microsoft.SqlAzure.DBEngine" Hosted="false"
Singleton="false" />
  <ClassType
ID="Microsoft.SqlAzure.Database.Master.$TemplateConfig/
TemplateIdString$" Accessibility="Internal" Abstract="false"
Base="$Reference/Self$Microsoft.SqlAzure.Database.Master"
Hosted="true" Singleton="false" />
  <ClassType
ID="Microsoft.SqlAzure.Database.User.$TemplateConfig//
TemplateIdString$" Accessibility="Internal" Abstract="false"
Base="$Reference/Self$Microsoft.SqlAzure.Database.User"
Hosted="true" Singleton="false" />
</ClassTypes>
```

A <Discoveries> section extracted from the listing above provides discovery details. For instance, a <Discoveries> section may contain one or more <Discovery> elements such as the following:

```
<Discovery
ID="Microsoft.SqlAzure.DBEngine.InitialDiscovery.$TemplateConfig/
TemplateIdString$" Enabled="onEssentialMonitoring"
Target="$Reference/
SC$Microsoft.SystemCenter.RootManagementServer"
ConfirmDelivery="false" Remotable="false" Priority="Normal">
  <Category>Discovery</Category>
  <DiscoveryTypes>
    <DiscoveryClass
TypeID="$Reference/Self$Microsoft.SqlAzure.DBEngine" />
    <DiscoveryClass
TypeID="Microsoft.SqlAzure.DBEngine.$TemplateConfig/
TemplateIdString$" />
    <DiscoveryRelationship
TypeID="$Reference/
SC$Microsoft.SystemCenter.HealthServiceShouldManageEntity" />
  </DiscoveryTypes>
  <DataSource ID="DS"
TypeID="$Reference/Self$Microsoft.SqlAzure.InitialDiscovery.DS">
    <IntervalSeconds>3600</IntervalSeconds>
    <ClassId>$MPElement[Name=
"Microsoft.SqlAzure.DBEngine.$TemplateConfig/
TemplateIdString$"]$</ClassId>>
    <ClassInstanceSettings>
      <Settings>
        <Setting>
<Name>$MPElement[Name="$Reference/
Self$Microsoft.SqlAzure.ServerRole"]/ServerName$</Name>
          <Value>$TemplateConfig/ServerName$</Value>
        </Setting>
        <Setting>
<Name>$MPElement[Name="$Reference/System$System.Entity"]/
DisplayName$</Name>
          <Value>$TemplateConfig/ServerName$</Value>
        </Setting>
      </Settings>
    </ClassInstanceSettings>
    <RelationshipId>$MPElement[Name="$Reference/
SC$Microsoft.SystemCenter.HealthServiceShouldManageEntity"]$
</RelationshipId>
    <SourceTypeId>$MPElement[Name="$Reference/
SC$Microsoft.SystemCenter.HealthService"]$</SourceTypeId>
      <SourceRoleSettings>
        <Settings>
          <Setting>
<Name>$MPElement[Name="$Reference/
Windows$Microsoft.Windows.Computer"]/PrincipalName$</Name>
            <Value>$TemplateConfig/ProxyAgentComputerPrincipalName$</Value>
          </Setting>
        </Settings>
      </SourceRoleSettings>
    <TargetTypeId>$MPElement[Name=
"Microsoft.SqlAzure.DBEngine.$TemplateConfig/
TemplateIdString$"]$</TargetTypeId>
      <TargetRoleSettings>
        <Settings>
          <Setting>
<Name>$MPElement[Name="$Reference/
Self$Microsoft.SqlAzure.ServerRole"]/ServerName$</Name>
            <Value>$TemplateConfig/ServerName$</Value>
          </Setting>
        </Settings>
      </TargetRoleSettings>
  </DataSource>
</Discovery>
```

A <DisplayStrings> section extracted from the listing above provides strings for identifying items in displays 132:

```
<DisplayStrings>
    <DisplayString
ElementID="Microsoft.SqlAzure.DBEngine.$TemplateConfig/
TemplateIdString$">
        <Name>SQL Azure Hosted SQL Server
($TemplateConfig/HostedServiceName$)</Name>
        <Description>SQL Azure Hosted SQL Server Class created
by template $TemplateConfig/Name$
($TemplateConfig/TemplateIdString$)</Description>
    </DisplayString>
    <DisplayString
ElementID="Microsoft.SqlAzure.DBEngine.InitialDiscovery.-
$TemplateConfig/TemplateIdString$">
        <Name>SQL Azure Discovery
($TemplateConfig/ServerName$)</Name>
        <Description>SQL Azure Discovery created by
$TemplateConfig/Name$ ($TemplateConfig/TemplateIdString$)
</Description>
    </DisplayString>
    <DisplayString
ElementID="Microsoft.SqlAzure.Database.Master.$TemplateConfig/
TemplateIdString$">
        <Name>SQL Azure Master AzureDatabase
($TemplateConfig/HostedServiceName$)</Name>
        <Description>SQL Azure Master Database Class created by
        template
$TemplateConfig/Name$ ($TemplateConfig/TemplateIdString$)
</Description>
    </DisplayString>
    <DisplayString
ElementID="Microsoft.SqlAzure.Database.User.$TemplateConfig/
TemplateIdString$">
        <Name>SQL Azure User AzureDatabase
($TemplateConfig/HostedServiceName$)</Name>
        <Description>SQL Azure User Database Class created by
        template
$TemplateConfig/Name$ ($TemplateConfig/TemplateIdString$)
</Description>
    </DisplayString>
</DisplayStrings>
```

Some Project T technologies include a target definition document 206 such as the following XML (<?xml version="1.0" encoding="utf-8" ?>) document:

```
<Targets
xmlns="http://schemas.microsoft.com/sqlserver/2010/12/HealthModel/
Targets.xsd"> <VersionFilePath>\\myservername\ProjectT\Versions
</VersionFilePath>
  <AbstractTarget Name="SqlCore" MinSqlVersion="9">
    <KnowledgeFile Name="SQLMonitoring">
      <Path>CoreSqlMonitoringKnowledge.xml</Path>
    </KnowledgeFile>
  </AbstractTarget>
  <Target Name="Box" MinSqlVersion="9"
TranslationEngine="StandardScomTranslator" InheritFrom="SqlCore">
    <InputTargetFile Name="HealthModelMPTemplate">
      <Path>SQLScomMPTemplate.xml</Path> </InputTargetFile>
    <KnowledgeFile Name="SQLScomMPContent">
      <Path>SQLScomMPContent.xml</Path>
    </KnowledgeFile>
    <ShortDescription>Microsoft SQL Server SCOM Monitoring
Management Pack</ShortDescription>
    <BaseVersion>7.1.1</BaseVersion>
<OutputTargetFile>Microsoft.SqlServer.Scom.Monitoring.xml
</OutputTargetFile>
  </Target>
  <Target Name="SqlAzure" MinSqlVersion="10"
TranslationEngine="SqlAzureScomTranslator" InheritFrom="SqlCore">
    <InputTargetFile Name="HealthModelMPTemplate">
      <Path>SqlAzureScomMPTemplate.xml</Path> </InputTargetFile>
    <KnowledgeFile Name="SqlAzureDiscovery">
      <Path>SqlAzureDiscoveryKnowledge.xml</Path>
    </KnowledgeFile>
    <RejectedTag>Corruption</RejectedTag>
    <RejectedTag>Assert</RejectedTag>
    <RejectedTag>Performance</RejectedTag>
    <RejectedTag>FileGroup</RejectedTag>
    <RejectedTag>File</RejectedTag>
    <ShortDescription>Microsoft SQL Azure SCOM Monitoring
Management Pack</ShortDescription>
    <BaseVersion>1.0.1</BaseVersion>
    <OutputTargetFile>Microsoft.SqlAzure.Scom.xml</OutputTargetFile>
  </Target>
  <Target Name="Atlanta" MinSqlVersion="9"
TranslationEngine="AtlantaTranslator" InheritFrom="SqlCore">
    <InputTargetFile Name="HealthModelMPTemplate">
      <Path>SQLAtlantaMPTemplate.xml</Path> </InputTargetFile>
    <AnnotationFile Name="Annotations">
      <Path>AtlantaAnnotations</Path> </AnnotationFile>
    <RejectedTag>Corruption</RejectedTag>
    <RejectedCategory>PerformanceCollection</RejectedCategory>
    <RejectedCategory>PerformanceHealth</RejectedCategory>
    <RejectedCategory>AvailabilityHealth</RejectedCategory>
    <ShortDescription>Microsoft SQL Server SCA Monitoring
Management Pack</ShortDescription>
    <BaseVersion>1.0.40</BaseVersion>
<OutputTargetFile>Microsoft.KnowledgeServices.SQLServer.Monitoring.
xml</OutputTargetFile>
  </Target>
  <TranslationEngineDependency Child="AtlantaTranslator"
Parent="StandardScomTranslator"/>
</Targets>
```

In some Project T technologies, a target definition document 206 and/or a distillation document 204 conforms to a schema, such as an XSD schema. An example of a schema is shown below. Consistent with this example, knowledge is modularized into core and target specific pieces using an inheritance mechanism. A child target type inherits all TargetFiles by default. However the child target type can replace (by name) a particular knowledge file if necessary, or even remove it (by providing a name but not a path). Tags provide an alternative (finer grained) approach to causing knowledge to either be included or rejected. As with other code herein, this example does not necessarily recite all features discussed herein, and has been reformatted to meet patent office document guidelines:

```
<xs:schema id="Targets"
targetNamespace="http://schemas.microsoft.com/sqlserver/2010/12/HealthModel
/Targets.xsd" elementFormDefault="qualified"
mlns="http://schemas.microsoft.com/sqlserver/2010/12/HealthModel/Targets.xsd"
xmlns:mstns="http://schemas.microsoft.com/sqlserver/2010/12/HealthModel/Targets.xsd"
xmlns:xs="http://www.w3.org/2001/XMLSchema">
  <xs:complexType name="NamedPathType"> <xs:sequence> <xs:element
name="Path" type="xs:string" minOccurs="0" maxOccurs="1"/> </xs:sequence>
<xs:attribute name="Name" type="xs:string" use="required" />
  </xs:complexType>
  <xs:complexType name="AbstractTargetType"> <xs:sequence> <xs:element
name="InputTargetFile" minOccurs="0" maxOccurs="unbounded"
type="NamedPathType" /> <xs:element name="KnowledgeFile" minOccurs="0"
```

-continued

```
maxOccurs="unbounded" type="NamedPathType" /> <xs:element
name="AnnotationFile" minOccurs="0" maxOccurs="unbounded"
type="NamedPathType" /> <xs:element name="AllowedTag" type="xs:string"
minOccurs="0" maxOccurs="unbounded" /> <xs:element name="RejectedTag"
type="xs:string" minOccurs="0" maxOccurs="unbounded" /> <xs:element
name="AllowedCategory" type="xs:string" minOccurs="0"
maxOccurs="unbounded" /> <xs:element name="RejectedCategory"
type="xs:string" minOccurs="0" maxOccurs="unbounded" /> </xs:sequence>
<xs:attribute name="Name" type="xs:string" use="required" /> <xs:attribute
name="InheritFrom" type="xs:string" use="optional" /> <xs:attribute
name="MinSqlVersion" type="xs:string" use="optional" /> <xs:attribute
name="MaxSqlVersion" type="xs:string" use="optional" /> <xs:attribute
name="MinHealthObjectModelVersion" type="xs:string" use="optional" />
<xs:attribute name="MaxHealthObjectModelVersion" type="xs:string"
use="optional" /> </xs:complexType>
  <xs:complexType name="TargetType"> <xs:complexContent> <xs:extension
base="AbstractTargetType"> <xs:sequence> <xs:element
name="ShortDescription" type="xs:string" /> <xs:element name="BaseVersion"
type="xs:string" /> <xs:element name="OutputTargetFile" minOccurs="0"
maxOccurs="1" type="xs:string" /> </xs:sequence> <xs:attribute
name="TranslationEngine" type="xs:string" use="optional" /> </xs:extension>
</xs:complexContent> </xs:complexType>
  <xs:element name="Targets">
  <xs:complexType> <xs:sequence> <xs:element name="VersionFilePath"
type="xs:string" /> <xs:choice maxOccurs="unbounded"> <xs:element
name="AbstractTarget" type="AbstractTargetType" /> <xs:element
name="Target" type="TargetType" /> </xs:choice> <xs:element
name="TranslationEngineDependency" minOccurs="0"
maxOccurs="unbounded"> <xs:complexType> <xs:attribute name="Parent"
type="xs:string" /> <xs:attribute name="Child" type="xs:string" />
</xs:complexType> </xs:element> </xs:sequence> </xs:complexType>
  </xs:element>
</xs:schema>
```

Some Project T technologies provide a representation of monitoring knowledge that is substantially more concise than conventional forms. For example, code from a conventionally developed manually-coded management pack for monitoring disk space for a SQL Server® box product includes over 9000 lines. By contrast, an equivalent portion of a distillation document 204 for computationally generated rule packs contains around 300 lines. Among the 300 lines are performance collection elements 216 such as the following:

```
<PerformanceCollection id="Database.DBSpaceFreePercent.Collection"
Class="Database" Category="PerformanceCollection"
Tags="DiskSpace,Database">
  <CounterName>DB Total Free Space (%)</CounterName>
  <PropertyName>DBFreeSpacePercent</PropertyName>
  <Tolerance>2</Tolerance>
  <ToleranceType>Absolute</ToleranceType>
</PerformanceCollection>
<PerformanceCollection id="DBFileGroup.SpaceFreePercent.Collection"
Class="FileGroup" Category="PerformanceCollection"
Tags="DiskSpace,FileGroup">
  <CounterName>DB File Group Free Space (%)</CounterName>
  <PropertyName>FreeSpacePercent</PropertyName>
  <Tolerance>10</Tolerance>
  <ToleranceType>Absolute</ToleranceType>
</PerformanceCollection>
<PerformanceCollection id="DBFile.SpaceFreeMegabytes.Collection"
Class="File" Category="PerformanceCollection" Tags="DiskSpace,File">
  <CounterName>DB File Free Space (MB)</CounterName>
  <PropertyName>FreeSpaceMB</PropertyName>
  <Tolerance>10</Tolerance>
  <ToleranceType>Absolute</ToleranceType>
</PerformanceCollection>
```

An aggregation element specifies how to aggregate collected data:

```
<Aggregate id="Database.DBSpaceMonitor" Class="Database"
Parent="Database.DBPerformanceMonitor"
       Category="PerformanceHealth" RollUp="WorstOf"/>
```

Also present in the concise representation provided by the distillation document 204 is the following monitor element; representation of monitors is quite concise in comparison with other approaches:

```
<ThresholdMonitor id="Database.DBSizePercentMonitor"
Class="Database" Category="PerformanceHealth"
Parent="Database.DBSpaceMonitor" Tags="DiskSpace,Database"
SourceClass="Performance">
  <Alert Parameters="Database,Instance,Computer"/>
  <WarningThreshold>20</WarningThreshold>
  <ErrorThreshold>10</ErrorThreshold>
  <CounterName>DB Total Free Space (%)</CounterName>
  <PropertyName>DBFreeSpacePercent</PropertyName>
</ThresholdMonitor>
```

Message elements are also present, such as the following example:

```
<Message id="Database.DBSizePercentMonitor.AlertMessage">
  <Name>Database Out of Space</Name>
  <Description>The database "{0}" in SQL instance
"{1}" on computer "{2}" is running out of space.
See "alert context" tab for more details.</Description>
</Message>
<SimpleMessage id="Database.DBSizePercentMonitor|Success">
Database
Free Space Acceptable</SimpleMessage>
<SimpleMessage id="Database.DBSizePercentMonitor|Warning">
Database
```

-continued

```
    Free Space Low</SimpleMessage>
        <SimpleMessage id="Database.DBSizePercentMonitor|Error">
        Database Free
        Space Critical</SimpleMessage>
```

Instructional content 228 is also provided in this example. Content may be given, for instance, by elements 216 such as the following:

```
<Article id="Database.DBSpaceMonitor">
    <Summary>
        <Paragraph>This monitor is the rollup monitor for all database space
monitoring for this object. If the state is unknown, either monitoring has
not begun for this object.</Paragraph>
    </Summary>
    <Causes>
        <Paragraph>An unhealthy state for this monitor indicates some
problem with another monitor running against this object and monitoring
database space.
View all current alerts from this object using this link:</Paragraph>
        <Paragraph>
            <Link condition="View"
href="Microsoft.SystemCenter.AlertView&viewtarget=
{$TARGET$}"
uri="MOM.Console.Exe">View Alerts</Link>
        </Paragraph>
    </Causes>
    <Resolutions type="UI">
        <Paragraph>Use the health explorer to drill down and find the
cause of the unhealthy state. Use the knowledge on the specific monitor
causing the issue to troubleshoot and fix the problem.</Paragraph>
    </Resolutions>
</Article>
```

In short, a relatively large amount of XML has been manually written to monitor disk space usage for the SQL Server® (mark of Microsoft Corporation) box product without using Project T technology. High-level Project T knowledge elements can represent similar functionality much more concisely. Running a knowledge compiler 202 on the knowledge elements produces a management pack for the same product, or for other products (the elements 216 provide a portable representation). The knowledge compiler translates the knowledge elements into a management pack and combines it with the appropriate template as specified by the targets file. In general, the translated management pack is different from the manually written management pack XML, because the Project T technology also includes a runtime component which simplifies the management pack XML used to provide similar monitoring. The runtime also assists in the portability aspects. As an example of portability, the knowledge compiler can be directed to create a cloud-based (SQL Azure™, mark of Microsoft Corporation) management pack instead of the box product management pack. Many other types of rule packs 210 may similarly be computationally generated, such as business intelligence rule packs, rule packs for different management platforms, and rule packs for different versions of various server products. Suitability is not necessarily limited to SQL Server® or even to Microsoft products; items and processes described herein can be implemented to assist in monitoring servers and applications of any type and kind for which monitoring tools 120 exist or can reasonably be created.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer system comprising:
a logical processor;
a memory in operable communication with the logical processor;
an SHCMK distillation document residing in the memory and having SHCMK monitoring elements declared in a high-level computer language, the SHCMK monitoring elements providing at least one platform-nonspecific pattern for monitoring at least one of: computational health, computational configuration;
a target identifier residing in the memory and specifying at least one target platform to be monitored; and an SHCMK compiler residing in the memory and having code which upon execution will compile the SHCMK distillation document and the target identifier as a collective input, and which will produce as an output a target-specific SHCMK rule pack that is specifically arranged to monitor computational health and/or computational configuration of the target platform.

2. The system of claim 1, wherein the system further comprises a template residing in the memory and containing a mapping from the SHCMK distillation document to a particular identified target.

3. The system of claim 1, wherein the system further comprises the target-specific SHCMK rule pack produced by the SHCMK compiler, the target-specific SHCMK rule pack containing rules for monitoring the target platform.

4. The system of claim 3, wherein the target-specific SHCMK rule pack also includes at least one of the following rule pack components:
a health model; a monitor code for monitoring a target;
a natural language instructional content for diagnosing health problems in a monitored target;
a natural language instructional content for diagnosing configuration problems in a monitored target;
a natural language instructional content for resolving health problems in a monitored target;
a natural language instructional content for resolving configuration problems in a monitored target.

5. The system of claim 1, wherein at least one of the following conditions is also satisfied:
the SHCMK distillation document monitoring elements are written at least partially in an XML schema language;
the target identifier identifies a SQL server installation;
the rule pack produced will be a database server management pack;
the rule pack produced will be an email server management pack;
the rule pack produced will be a calendaring server management pack;
the rule pack produced will be an intranet server management pack;
the rule pack produced will be an extranet server management pack;
the rule pack produced will be an enterprise software server management pack;
the rule pack produced will be a middleware server management pack.

6. The system of claim 1, further comprising a target definition document residing in the memory and including a target type and a target instance, the target instance being an instance of the target type, and the target instance identifying a target product and a target product version.

7. The system of claim 1, further comprising an SHCMK runtime which provides runtime support code that is shared by and invocable by multiple SHCMK rule packs for different target platforms.

8. A process for use by a user to generate a rule pack, the process comprising the steps of:
indicating by electronic input to an SHCMK compiler machine an SHCMK distillation document configuring a computer-readable memory, the SHCMK distillation document having monitoring elements declared in a high-level computer language, the monitoring elements providing at least one platform-nonspecific pattern for monitoring at least one of:
computational health, computational configuration;
denoting by electronic input to the SHCMK compiler machine a target definition document which identifies at least one target platform to be monitored; and
acquiring an electronic digital target-specific SHCMK rule pack generated computationally by the SHCMK compiler machine from the SHCMK distillation document and the target definition document, the rule pack being specific to a target platform that is identified in the target definition document, the rule pack also including an implementation of a monitoring element of the SHCMK distillation document.

9. The process of claim 8, further comprising at least one of the following tailoring steps prior to the acquiring step:
tailoring the HCMK compiler machine to generate on-premises rule packs, and wherein the acquired rule pack is an on-premises rule pack; or
tailoring the HCMK compiler machine to generate cloud-based rule packs, and wherein the acquired rule pack is a cloud-based rule pack.

10. The process of claim 8, further comprising at least one of the following:
causing the SHCMK compiler machine to generate, from the same monitoring element(s), at least two different rule packs for respective different versions of a particular target product that is identified in the target definition document;
causing the SHCMK compiler machine to generate, from the same monitoring element(s), at least two different rule packs for respective different target products that are identified in the target definition document.

11. The process of claim 8, wherein the implementation of the monitoring element in the acquired rule pack comprises at least one of the following: server management pack XML code, server management pack script code.

12. A computer-readable storage medium configured with data and with instructions that when executed by at least one processor causes the processor(s) to perform a computational process for generating a rule pack, the process comprising the steps of:
obtaining a distillation document configuring a computer-readable memory, the distillation document having monitoring elements declared in a high-level computer language, the monitoring elements providing at least one platform-nonspecific pattern for generating at least one of: computational rules directed to health, computational rules directed to configuration;
getting a digital target identifier, the target identifier identifying at least one target platform, namely, at least one of the following: a database server, an email server, a calendaring server, an intranet server, an extranet server, an enterprise software server, a middleware server; and
computationally generating an electronic digital rule pack from the distillation document and the target identifier, the generated rule pack containing human-readable machine-parsable computational rules specific to the target platform.

13. The configured medium of claim 12, wherein the distillation document declares at least one of the following monitoring elements:
a monitor alert type which defaults to autoresolution;
a monitor alert type which defaults to alert on warning;
a textual instructional content type;
a target attributes group;
a tag and version attributes group;
a monitored item type;
an event alert type;
a performance collection type;
a policy monitor type;
a threshold monitor type.

14. The configured medium of claim 13, wherein the distillation document declares at least three of the listed monitoring elements.

15. The configured medium of claim 13, wherein the distillation document declares at least six of the listed monitoring elements.

16. The configured medium of claim 12, wherein the process further comprises using a platform-specific target template to map at least one monitoring element to a particular target platform while generating the rule pack.

17. The configured medium of claim 12, wherein the process further comprises associating monitoring elements with target sets by tagging the monitoring elements.

18. The configured medium of claim 12, wherein the process comprises obtaining monitoring elements provided by at least two of the following contributors: a target product vendor developer, a target product customer support technician, an independent consultant, an independent software vendor, an administrator of a target product.

19. The configured medium of claim 12, wherein computational rule pack generation satisfies at least one of the following conditions: generated rule packs show greater consistency between rule packs than manually written rule packs; generated rule packs are more concise than functionally interchangeable manually written rule packs; generated rule packs are produced more quickly than functionally interchangeable manually written rule packs.

20. The configured medium of claim 12, wherein the process further comprises at least one of the following:
- generating, from the same monitoring element(s), at least two different rule packs for respective different versions of a particular target product that is identified in the target identification;
- generating, from the same monitoring element(s), at least two different rule packs for respective different target products that are identified in the target identification.

* * * * *